United States Patent
Kuo et al.

(10) Patent No.: US 11,679,465 B2
(45) Date of Patent: Jun. 20, 2023

(54) MACHINE TOOL ADJUSTMENT METHOD AND SYSTEM THEREOF

(71) Applicant: Industrial Technology Research Institute, Hsinchu (TW)

(72) Inventors: Chen-Hui Kuo, Taichung (TW); Tian-You Hou, Kaohsiung (TW); Jia-Cheng Sun, Changhua County (TW); Chen-Yu Kai, Pingtung County (TW); Yung-Chih Lin, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 648 days.

(21) Appl. No.: 16/823,348

(22) Filed: Mar. 19, 2020

(65) Prior Publication Data

US 2021/0237218 A1     Aug. 5, 2021

(30) Foreign Application Priority Data

Jan. 30, 2020    (TW) ................................ 109102735

(51) Int. Cl.
     *B23Q 17/22*        (2006.01)
     *B23Q 17/10*        (2006.01)

(52) U.S. Cl.
     CPC ......... *B23Q 17/2233* (2013.01); *B23Q 17/10* (2013.01)

(58) Field of Classification Search
     CPC .... B23Q 17/10; B23Q 17/2233; B23Q 17/22; G05B 2219/37607; G05B 2219/41084;

(Continued)

(56) References Cited

U.S. PATENT DOCUMENTS

| 6,859,747 B2 | 2/2005 | Yutkowitz |
| 6,920,408 B2 | 7/2005 | Yutkowitz |

(Continued)

FOREIGN PATENT DOCUMENTS

| CN | 101022917 | 8/2007 |
| CN | 101620421 | 1/2010 |

(Continued)

OTHER PUBLICATIONS

Józwik et al , Diagnostic of CNC Lathe With QC 20 Ballbar System , Advances in Science and Technology Research Journal, vol. 9, No. 28, Dec. 2015, pp. 96-102 (Year: 2015).*

(Continued)

*Primary Examiner* — Mohammad K Islam
(74) *Attorney, Agent, or Firm* — Jciprnet

(57) ABSTRACT

This disclosure provides a machine tool adjustment method and system thereof. The machine tool adjustment method includes the following steps: enabling a machine tool to perform a circular test; obtaining a measured error value $E_m$ from a measuring instrument, and the measured error value $E_m$ is defined by the difference between the actual circular trajectory and the preset circular trajectory during the circular test; determining an error condition of the tool machine from the measured error value $E_m$; determining whether the error condition is less than a predetermined criteria; if not, defining a compensation parameter according to the error condition and enabling the machine tool to perform another circular test according to the set compensation parameter until the error condition is less than the predetermined criteria; and if yes, ending the circular test and the machine tool adjustment is finished.

12 Claims, 6 Drawing Sheets

(58) Field of Classification Search
CPC ............. G05B 19/401; G05B 19/404; G05B 2219/37581

See application file for complete search history.

(56) References Cited

U.S. PATENT DOCUMENTS

| | | | | |
|---|---|---|---|---|
| 2003/0033105 A1* | 2/2003 | Yutkowitz | ............ | G05B 19/404 702/105 |
| 2011/0213490 A1* | 9/2011 | Liu | ............ | B23Q 17/2233 700/193 |
| 2018/0106586 A1* | 4/2018 | Gruber | ............ | G01B 21/045 |
| 2019/0126474 A1 | 5/2019 | Skogsrud et al. | | |
| 2019/0143470 A1* | 5/2019 | Chen | ............ | G05B 19/401 356/138 |
| 2022/0075342 A1* | 3/2022 | Szipka | ............ | G01P 3/44 |

FOREIGN PATENT DOCUMENTS

| | | |
|---|---|---|
| CN | 102023612 | 4/2011 |
| CN | 102478810 | 5/2012 |
| CN | 102430683 | 11/2013 |
| CN | 104049567 | 9/2014 |
| CN | 104942651 | 9/2015 |
| CN | 107450473 | 12/2017 |
| CN | 108073188 | 5/2018 |
| CN | 108362493 | 8/2018 |
| CN | 109176505 | 1/2019 |
| JP | 2016218745 | 12/2016 |
| JP | 2016218746 | 12/2016 |
| TW | 200702101 | 1/2007 |
| TW | I329246 | 8/2010 |
| TW | 201412452 | 4/2014 |
| TW | 201412454 | 4/2014 |
| TW | 201435529 | 9/2014 |

OTHER PUBLICATIONS

The Renishaw QC20-W wireless ballbar for machine tool performance diagnosis, Sales Brochure, pp. 1-8 (Year: 2013).*

Duan et al. ,Optimal Bayesian early fault detection for CNC equipment using hidden semi-Markov process (Year: 2019).*

Lei et al. ,NURBS-based fast geometric error compensation for CNC machine tools (Year: 2008).*

Office Action of China Counterpart Application, dated Jan. 25, 2022, pp. 1-12.

Shih-Ming Wang, et al., "An Adaptive Parameter Tuning Method with On-machine Weight Identification Function for CNC Machine Tools." Applied Mechanics and Materials, vol. 479-480, Dec. 2013, pp. 268-273.

Mahdi Sparham, et al., "ANFIS modeling to predict the friction forces in CNC guideways and servomotor currents in the feed drive system to be employed in lubrication control system." Journal of Manufacturing Processes, vol. 28, Aug. 2017, pp. 168-185.

Pau-Lo Hsu, et al., "Applications of self-tuning control on industrial CNC machines." International Journal of Machine Tools and Manufacture, vol. 34, No. 6, Aug. 1994, pp. 859-877.

K. J. Astrom, et al., "Automatic tuning and adaptation for PID controllers—A Survey." Control Engineering Practice, vol. 1, No. 4, Aug. 1993, pp. 699-714.

Wei-Fan Lin, et al., "Friction Compensation Design for Velocity-Controlled Feed Drive Motions of CNC Machines." Proceedings of the 8th World Congress on Intelligent Control and Automation, Jun. 21-25, 2011, pp. 182-187.

K. J. Astrom, et al., "The future of PID control." Control Engineering Practice, vol. 9, No. 11, Nov. 2001, pp. 1163-1175.

"Office Action of Taiwan Counterpart Application", dated Sep. 17, 2020, p. 1-p. 6.

* cited by examiner

MACHINE TOOL ADJUSTMENT METHOD AND SYSTEM THEREOF

CROSS-REFERENCE TO RELATED APPLICATION

This application claims the priority benefit of Taiwan application serial no. 109102735, filed on Jan. 30, 2020. The entirety of the above-mentioned patent application is hereby incorporated by reference herein and made a part of this specification.

TECHNICAL FIELD

This disclosure relates to a machine tool adjustment method and an adjustment system thereof, and more particularly, to a machine tool circular error compensation adjustment method and an adjustment system thereof.

BACKGROUND

Machine tools are normally subjected to a circular test before being shipped to confirm that the matching results of the axial servo of each axis and mechanism meet the requirements. Typically double-ball bar (DBB) or other circular trajectory measuring instrument are adopted in the circular test to acquire the movement error at the end of the machine tool servo axis. However, after a long period of use by the end user and due to the adverse working environment, the circular error during actual processing will gradually increase, even exceeding the allowable tolerance; in other words, the initial circular control parameter setting before shipping barely meets the requirement and has to be re-tested and adjusted.

At present, although the machine tool controller manufacturers all have the function of automatically compensating for errors such as backlash and friction, the source of error comes from the control loop (for example, obtained from work stations by an encoder, an optical ruler, etc.), and the error condition at the end (such as the tip point of a spindle) of the actual machine tool mechanism is not taken into consideration. Accordingly, the conventional adjustment process is performed by obtaining the circular trajectory of the machine tool by means of measuring instrument first, and then adjusting the controller parameter of the machine tool manually to make correction repeatedly until the desired result is achieved. In view of the above, the solution of several embodiments are proposed below.

SUMMARY

The machine tool adjustment method in this disclosure includes the following steps: enabling a machine tool to perform multiple circular tests; obtaining a measured error value $E_m$ from a measuring instrument, and the measured error value $E_m$ is defined by the difference between the actual circular trajectory when the machine tool performs the circular test and the preset circular trajectory; determining an error condition of the machine tool from the measured error value $E_m$; determining whether the error condition is less than a predetermined criteria; if the error condition is not less than a predetermined criteria, defining a compensation parameter according to the error condition and enabling the machine tool to perform another circular test according to the compensation parameter that is set and repeat the above steps until it is determined that the error condition is less than the predetermined criteria; and if the error condition is less than the predetermined criteria, ending the circular test and the machine tool adjustment is finished.

A machine tool adjustment system in this disclosure includes a memory and a processor. The memory is configured for storing an error analysis module and an error compensation module. The processor is coupled to the memory. The processor is coupled to the memory and is configured to execute the error analysis module and the error compensation module. The processor executes the error analysis module to perform the following steps: obtaining a measured error value $E_m$ from a measuring instrument, and the measured error value $E_m$ is defined by the difference between the actual circular trajectory when the machine tool performs the circular test and the preset circular trajectory; and determining an error condition of the machine tool from the measured error value $E_m$. The processor executes the error compensation module to perform the following steps: determining whether the error condition is less than a predetermined criteria; if the error condition is not less than a predetermined goal, defining a compensation parameter according to the error condition, and providing the compensation parameter to a controller of the machine tool to set the compensation parameter, so as to enable the machine tool to perform another circular test according to the compensation parameter that is set and repeat the above steps until it is determined that the error condition is less than the predetermined goal; and if it is determined that the error condition is less than the predetermined goal, notifying the controller of the machine tool to end the circular test and the machine tool adjustment is finished.

Based on the above, the machine tool adjustment method and the system thereof in the disclosure can automatically determine the error condition of the machine tool with respect to the end of the actual machine tool mechanism, automatically make compensation according to the error condition, and optimize the compensation parameters, thereby reducing the time for adjusting the machine tool, and further improving the overall performance of the machine tool to ensure machining accuracy.

In order to make the above-mentioned features and advantages of this disclosure more comprehensible, the following embodiments are described in detail with the accompanying drawings as follows.

DESCRIPTION OF EMBODIMENTS

Figure 1:
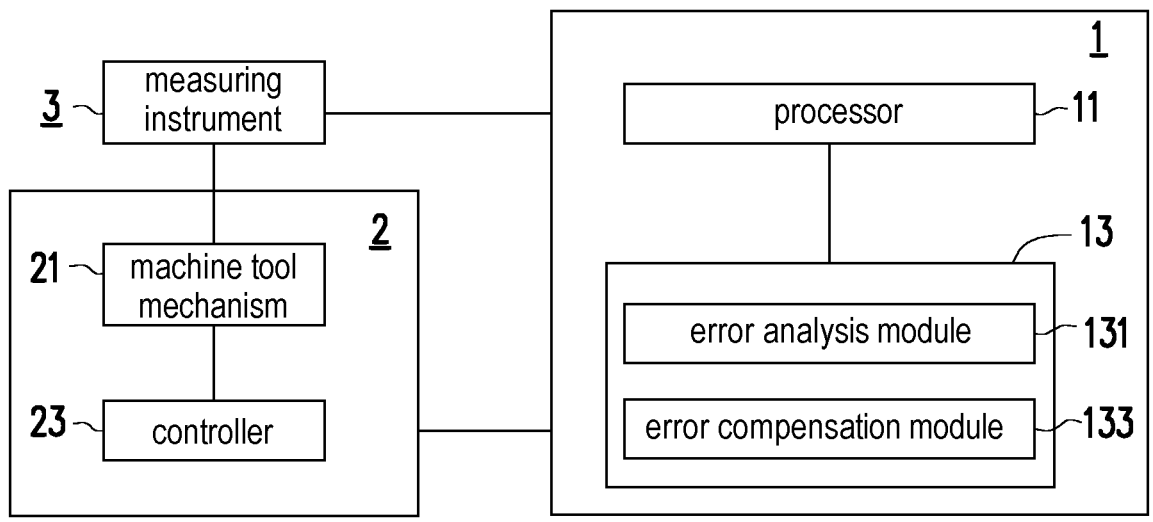
FIG. 1 is a block diagram of a machine tool adjustment system according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram of a machine tool adjustment system according to an embodiment of the disclosure. Referring to FIG. 1, the machine tool adjustment system 1 includes a processor 11 and a memory 13. The memory 13 may include an error analysis module 131 and an error compensation module 133. In this embodiment, the processor 11 is coupled to the memory 13 and is configured to execute the error analysis module 131 and the error compensation module 133 for machine tool adjustment. It should be noted that this disclosure provides no limitation to the implementation of the machine tool adjustment system 1. The machine tool adjustment system 1 of this embodiment may be, for example, digital systems or cloud platforms applied to a personal computer (PC), a notebook computer, an industrial computer (IPC), a cloud server, or the like, or software programs installed in the above computer device for users to operate the computer device so that the adjustments can be performed automatically, thereby realizing the adjustment of the error compensation for machine tools in this disclosure.

In this embodiment, the processor 11 may be, for example, a central processing unit (CPU), or other programmable general-purpose or specific-purpose microprocessor, digital signal processor (DSP), programmable controller, application specific integrated circuits (ASIC), programmable logic device (PLD), other similar processing devices, or a combination of these devices.

In this embodiment, the memory 13 may be, for example, a dynamic random access memory (DRAM), a flash memory, or a non-volatile random access memory (NVRAM), etc. In this embodiment, the error analysis module 131 and the error compensation module 133 may be, for example, a software application. Therefore, the memory 13 can store the error analysis module 131 and the error compensation module 133 in advance for the processor 11 to access and execute. It should be noted that, in another embodiment, the error analysis module 131 and the error compensation module 133 may also be stored in a non-transitory computer-readable storage medium. By loading the error analysis module 131 and the error compensation module 133 into a computer device, the machine tool adjustment method described in the embodiments of the present disclosure can be implemented.

Please refer to FIG. 1 further. In this embodiment, the machine tool adjustment system 1 is electrically connected to the machine tool 2 and the measuring instrument 3. The machine tool 2 includes a machine tool mechanism 21 and a controller 23. The machine tool mechanism 21 includes a work station, a spindle, etc. The controller 23 is electrically connected to the machine tool mechanism 21 and sends instructions to enable the machine tool mechanism 21 to operate. The measuring instrument 3 (such as a double-ball bar) is movably arranged on the machine tool mechanism 21 to measure the machine tool mechanism 21. The machine tool adjustment system 1 obtains measured data from the measuring instrument 3, determines the error condition of the machine tool 2 based on the measured data, defines compensation parameters according to the error condition, and provides the compensation parameters to the controller 23 for making compensation to the machine tool mechanism 21. For the detailed implementation of each phase, several embodiments of flowchart of steps are described in details below.

Figure 2:
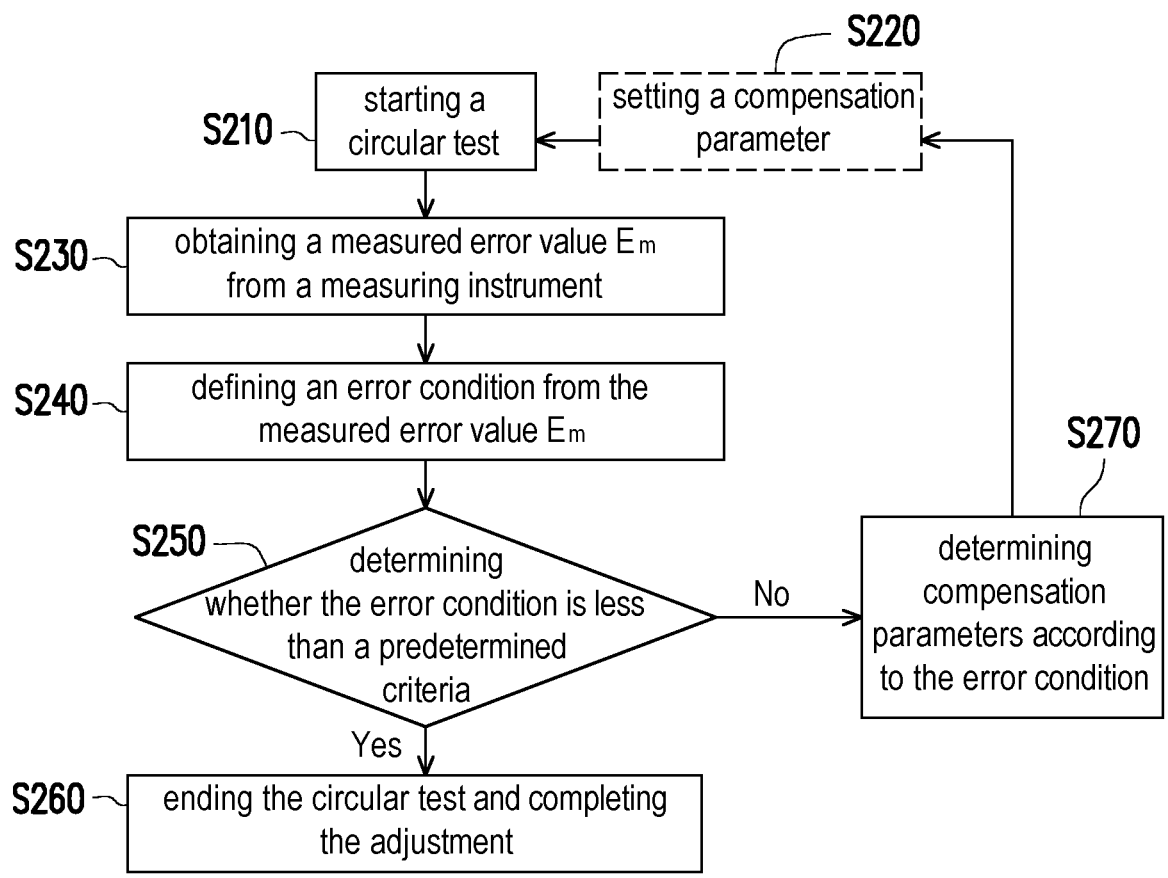
FIG. 2 is a flowchart of steps of a machine tool adjustment method according to another embodiment of the disclosure.

FIG. 2 is a flowchart of steps of a machine tool adjustment method according to another embodiment of the disclosure. Please refer to FIG. 1 and FIG. 2, in this embodiment, after the measuring instrument 3 has been set on the machine tool mechanism 21 of the machine tool 2, the operator can set the circular test preset conditions through the human-machine interface (not shown) of the machine tool adjustment system 1, including the test plane, circular direction (clockwise or counterclockwise), preset radius of circular trajectory, circular speed and so on. Next, the machine tool adjustment system 1 will automatically send a signal for the controller 23 to issue a circular test instruction to the machine tool mechanism 21 according to the preset circular test preset conditions, so that the machine tool 2 starts the circular test (step S210).

In another embodiment, after the machine tool 2 completes the first circular test, if the result of the circular test shows that the circular servo is not synchronized and the parameters of the axes are not consistent, the operator can check and adjust the parameters set by the controller 23 through the human-machine interface of the machine tool adjustment system 1 to confirm the parameters, for example, including position gain, speed gain, position feedforward, acceleration and deceleration time, etc., that cause servo asynchronization, and after the parameters are adjusted and the servo synchronization is confirmed, then the circular test is performed again (step S210).

Next, in step S230, the machine tool adjustment system 1 can obtain the measured error value $E_m$ from the measuring instrument 3 disposed on the machine tool mechanism 21. The measured error value $E_m$ is defined by the difference between the actual circular trajectory when the machine tool 2 performs the current circular test and the preset circular trajectory (set before performing step S210). After the preset circular time T (for example, it can be the time of circulating for two circles, that is, T=4π*preset radius/circular speed) has passed, the machine tool adjustment system 1 will automatically send a signal to notify the controller 23 of the machine tool 2 that the circular test has been completed. Meanwhile, the processor 11 of the machine tool adjustment system 1 executes the error analysis module 131 pre-stored in the memory 13 to perform step S240: defining the error condition of the machine tool 2 from the measured error value $E_m$.

Figure 3:
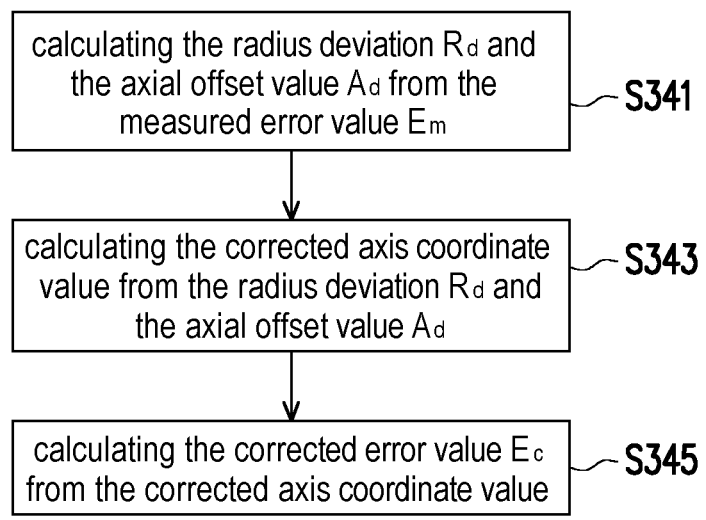
FIG. 3 is a flowchart of detailed steps of an embodiment of step S240 in FIG. 2.
Figure 4A:
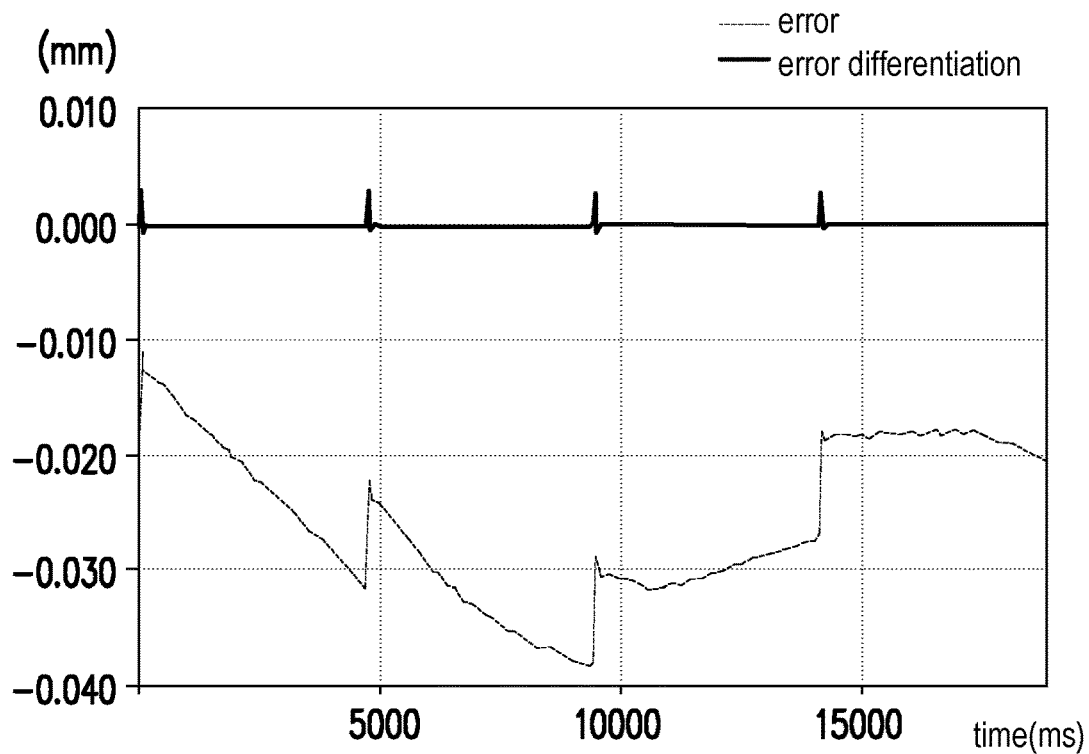
FIG. 4A is a diagram showing the relationship between measured error values and time according to an embodiment of the disclosure.
Figure 4B:
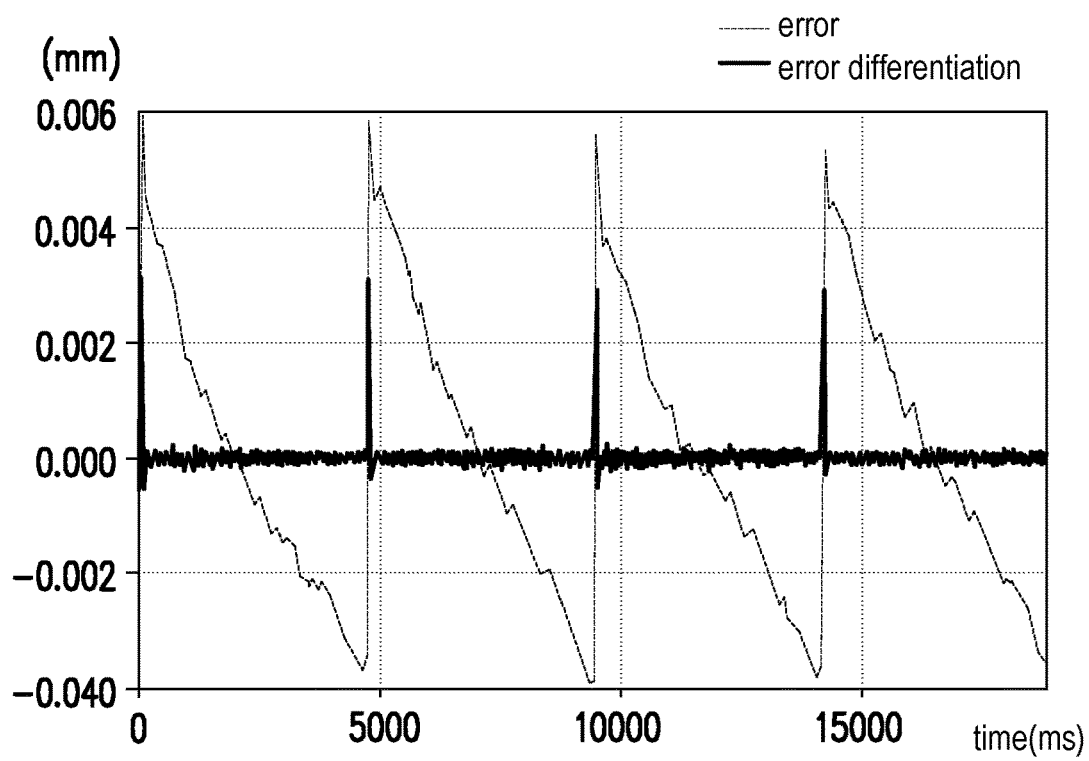
FIG. 4B is a diagram showing the relationship between the corrected error value and time corresponding to FIG. 4A of the disclosure.
Figure 5:
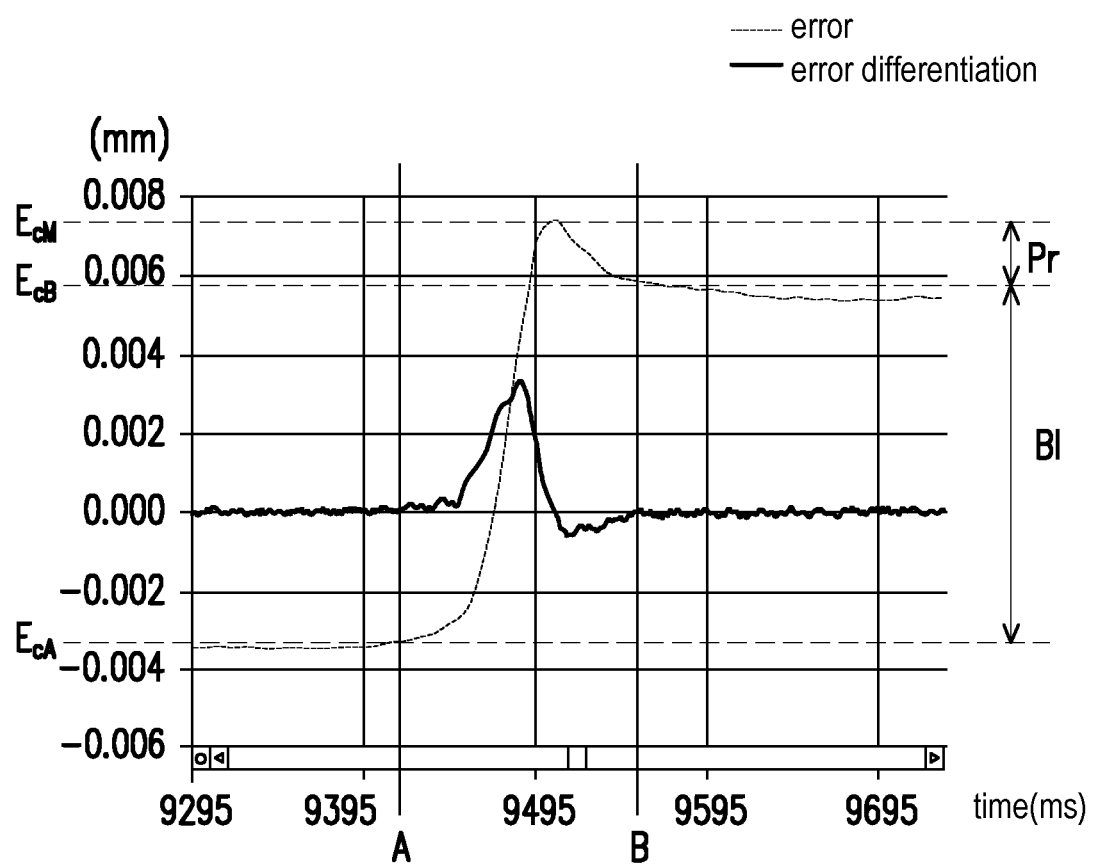
FIG. 5 is a diagram showing the relationship between the corrected error value and time in a period of time corresponding to FIG. 4B of the disclosure.

Please refer to FIG. 3, FIG. 4A, FIG. 4B, and FIG. 5, which explain how to define the error condition of the machine tool 2 from the measured error value $E_m$ (step S240). FIG. 3 is a flowchart of detailed steps of an embodiment of step S240 in FIG. 2. FIG. 4A is a diagram showing the relationship between measured error values and time according to an embodiment of the disclosure. FIG. 4B is a diagram showing the relationship between the corrected error value and time corresponding to FIG. 4A of the disclosure. FIG. 5 is a diagram showing the relationship between the corrected error value and time in a period of time corresponding to FIG. 4B of the disclosure.

As shown in FIG. 3, in this embodiment, first, the processor 11 of the machine tool adjustment system 1 executes the error analysis module 131 that can be stored in the memory 13 in advance to perform step S341: obtaining the measured error value $E_m$ by the measuring instrument 3, calculating the radius deviation $R_d$ and the axial offset value $A_d$.

More specifically, in this embodiment, in step S341, the measured error value $E_m$ can be defined by the difference between the actual radius $r_a$ of the actual circular trajectory when the machine tool 2 performs the circular test and the preset radius $r_d$ of the preset circular trajectory that is set before the circular test is performed (i.e., the measured error value $E_m$=actual radius $r_a$–preset radius $r_d$). The measured error value $E_m$ will change with time as the circular test goes on. As shown in FIG. 4A, the error values (corresponding to the measured error value $E_m$) obtained by the measuring instrument 3 at different time points are different, and by differentiating the error values, the time point at which the error occurred (the value deviates from 0) is shown more clearly.

Moreover, in step S341, the radius deviation amount $R_d$ and the axial offset value $A_d$ can be further calculated by the following formula:

$$R_d = \frac{\sum_1^n E_m}{n},$$

n is the number of times of obtaining the measured error value $E_m$; and $$A_d = \frac{\sum_1^n E_{m'}}{n},$$

$E_m'$ is uniaxial component of the measured error value $E_m$.

Then, the processor 11 of the machine tool adjustment system 1 executes the error analysis module 131 which can be stored in the memory 13 in advance to perform step S343: calculating the corrected axis coordinate value from the radius deviation $R_d$ and the axial offset value $A_d$. Please note that when the machine tool 2 performs this circular test, the measured error value $E_m$ corresponding to each time point can be obtained through the measuring instrument 3, and then the uniaxial component of the measured error value $E_m$ can be obtained through calculation, i.e., the 1st axis coordinate value $x_1$ of the first axis (for example, the X axis in a rectangular coordinate system) and the 2nd axis coordinate value $x_2$ of the second axis for example, the Y axis in a rectangular coordinate system), thereby obtaining the error condition of the machine tool 2 (more specifically, the end of machine tool mechanism 21). The 1st axis coordinate value $x_1$ and the 2nd axis coordinate value $x_2$ corresponding to the measured error value $E_m$ can be calculated through the following formula:

1st axis coordinate value $x_1$=(preset radius $r_d$+measured error value $E_m$)×cos θ; and 2nd axis coordinate value $x_2$=(preset radius $r_d$+measured error value $E_m$)×sin θ, and θ is between 0 and 360 degrees.

However, if correction is not made, the measured error value $E_m$ obtained directly through the measuring instrument 3 and the circular trajectory generated corresponding to uniaxial component (the first axis coordinate value and the second axis coordinate value) may appear oblique or non-circular. Therefore, in this embodiment, the corrected axis coordinate value is obtained through calculation in step S343, so as to better define the error condition of the machine tool 2 subsequently.

More specifically, in this embodiment, in step S343, the corrected axis coordinate value can be calculated through the following formula:

corrected 1st axis coordinate value $x_1'$=–1st axial offset value $A_{d1}$+(preset radius $r_d$+measured error value $E_m$–radius deviation $R_d$)×cos θ; and corrected 2nd axis coordinate value $x_2'$=–2nd axial offset value $A_{d2}$+(preset radius $r_d$+measured error value $E_m$–radius deviation $R_d$)×sin θ.

Then, the processor 11 of the machine tool adjustment system 1 executes the error analysis module 131 that can be stored in the memory 13 in advance to perform step S345: calculating the corrected error value $E_c$ from the corrected axis coordinate values. The corrected error value $E_c$ corresponds to the measured error value $E_m$, and will change with time as the circular test goes on, as shown in FIG. 4B. In FIG. 4B, the corrected error value (corresponding to the corrected error value $E_c$) is indicated by dashed lines, and the solid line indicates that the error value in FIG. 4B is differentiated to more clearly show the time point at which the error (the value deviates from 0) is occurred.

More specifically, in this embodiment, the corrected error value $E_c$ can be calculated through the corrected 1st axis coordinate value $x_1'$ and the corrected 2nd axis coordinate value $x_2'$ obtained from the previous step S343 as well as the following formula:

$$\sqrt{(\text{corrected } 1st \text{ axis coordinate value } x_1')^2 + (\text{corrected } 2nd \text{ axis coordinate value } x_2')^2} - \text{the preset radius } r_d.$$

After completing step S345, the corrected error value within a period of time is obtained from FIG. 4B, which then forms the diagram showing the relationship between the corrected error value $E_c$ and time in a period of time shown in FIG. 5. In FIG. 5, the time point at which the corrected error value $E_c$ (corresponding to the error value indicated by the dashed line and the error differential value indicated by the solid line in FIG. 5) begins to change significantly is defined as the quadrant-passing-through start point A of the machine tool 2 when performing the circular test; the time point at which the error differential value becomes stable is defined as the protrusion end point B of the machine tool 2 when performing the circular test; and the corrected error value $E_c$ located at the quadrant-passing-through start point A is defined as the point A error value $E_{cA}$, the corrected error value $E_c$ located at the protrusion end point B is defined as the point B error value $E_{cB}$, and the maximum value of the corrected error value $E_c$ is defined as the maximum error value $E_{cM}$. Next, the difference between the point A error value $E_{cA}$ and the point B error value $E_{cB}$ is calculated to obtain the backlash value Bl of the machine tool 2 when performing the circular test, and the difference between the maximum error value $E_{cM}$ and the point B error value $E_{cB}$ is calculated to obtain the protrusion value Pr of the machine tool 2 when performing the circular test.

Figure 6A:
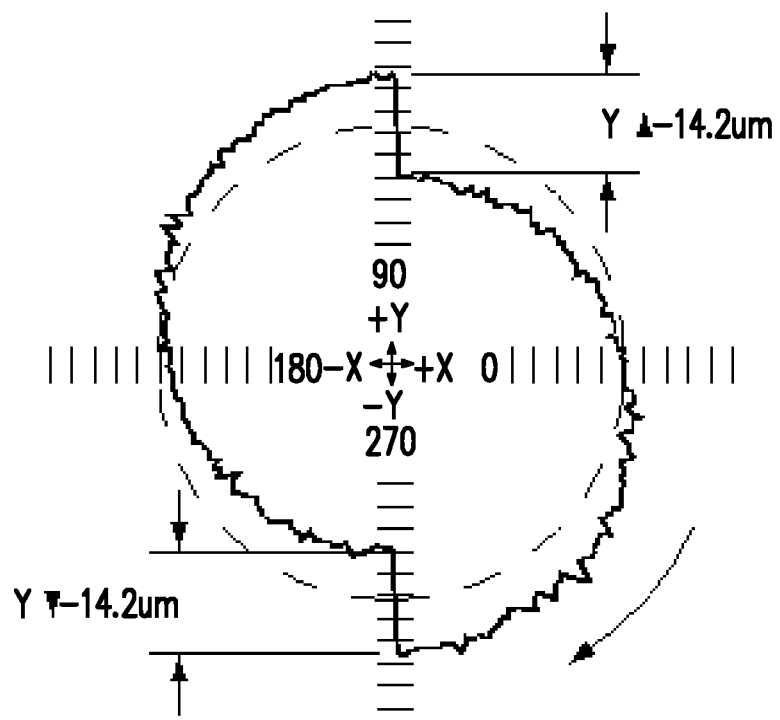
FIG. 6A is a circular test trajectory diagram according to an embodiment of the disclosure.
Figure 6B:
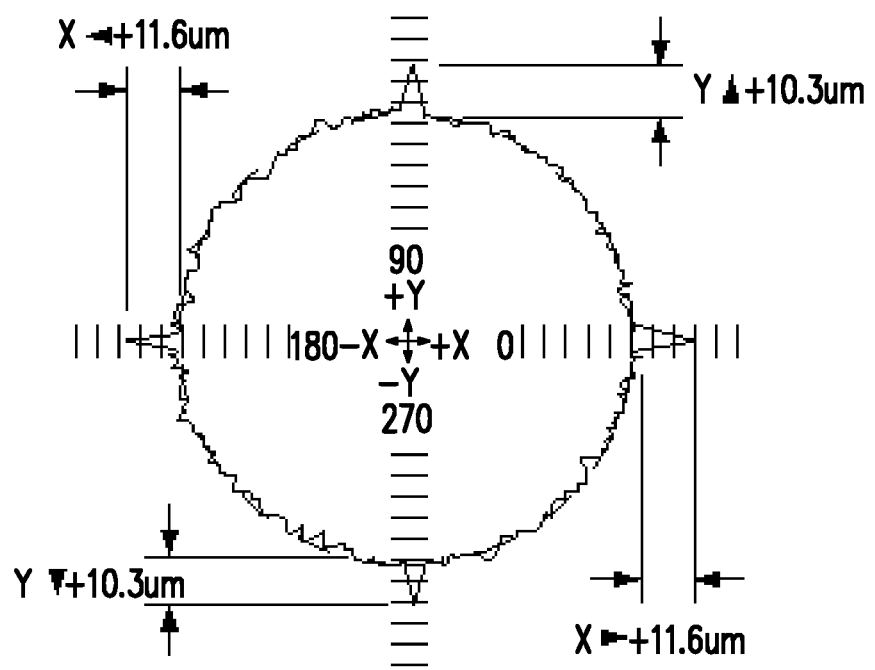
FIG. 6B is a circular test trajectory diagram according to another embodiment of the disclosure.

Please refer to FIG. 6A and FIG. 6B for the backlash and protrusion. FIG. 6A is a circular test trajectory diagram according to an embodiment of the disclosure. FIG. 6B is a circular test trajectory diagram according to another embodiment of the disclosure.

In FIG. 6A, the circular dashed lines represent the preset circular trajectory that is set before the machine tool 2 performs the circular test, and the solid line represents the actual circular trajectory when the machine tool 2 performs the circular test. By comparing the solid line with the dashed lines, it can be obtained that, in the embodiment, the actual circular trajectory (solid line) of the machine tool 2 will be offset reversely from the preset circular trajectory (dashed line) in the Y axis when the quadrant is switched, −14.2 μm marked in FIG. 6A means that the reverse backlash of the machine tool 2 in the Y axis during the circular test is −14.2 μm. The reverse backlash reflects the error condition of the machine tool 2.

In FIG. 6B, the solid line represents the actual circular trajectory when the machine tool 2 performs the circular test. As can be seen from the drawing, in the embodiment, the actual circular trajectory (solid line) of the machine tool 2 is offset from the preset circular trajectory that is originally a circle in the X axis and the Y axis when the quadrant is switched and forms a protrusion; the +10.3 μm and +11.6 μm marked in FIG. 6B mean that the protrusion value of the machine tool 2 in the Y axis in the circular test is 10.3 μm, and the protrusion value thereof in the X axis is 11.6 μm. The protrusion values reflect the error condition of the machine tool 2.

Please refer back to FIG. 2, and the steps of the machine tool adjustment method in the present disclosure will be further explained. After the processor 11 of the machine tool adjustment system 1 has performed the foregoing step S240 (the error condition is determined from the measured error value $E_m$), the processor 11 will execute the error compensation module 133 to perform steps S250 to S270.

As shown in FIG. 2, in this embodiment, the processor 11 of the machine tool adjustment system 1 executes the error compensation module 133 that can be stored in the memory 13 in advance to perform step S250: determining whether the error condition is less than a predetermined criteria. More specifically, in this embodiment, in step S250, the processor 11 of the machine tool adjustment system 1 can learn the error condition of the machine tool 2 from the previous step S240, such as the backlash value or the protrusion value, and by comparing the error condition determined by the measured error value $E_m$ with the allowable error condition (that is, the so-called predetermined criteria in step S250) that is preset by the operator or the system, it can be obtained whether the error condition of the machine tool 2 is less than the predetermined criteria.

If it is determined that the error condition is less than the predetermined criteria, for example, the calculated backlash value is less than the set backlash value, according to an embodiment of the present disclosure, the machine tool adjustment method proceeds to step S260: end the circular test and complete the adjustment. More specifically, in step S260, the processor 11 of the machine tool adjustment system 1 executes the error compensation module 133 that can be stored in the memory 13 in advance, and notifies the controller 23 of the machine tool 2 to end the circular test, thereby completing adjustment of the machine tool 2.

In step S250, if the processor 11 of the machine tool adjustment system 1 executes the error compensation module 133 and determines that the error condition of the machine tool 2 is not less than the predetermined criteria, for example, the calculated protrusion value is greater than the set protrusion value, then proceed to step S270: determining compensation parameters according to the error condition.

Figure 7:
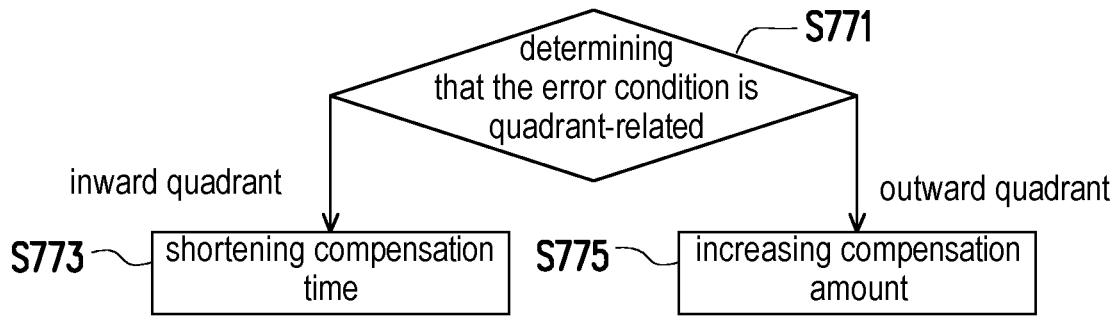
FIG. 7 is a flowchart of steps for defining compensation parameters according to an embodiment of the disclosure.
Figure 8:
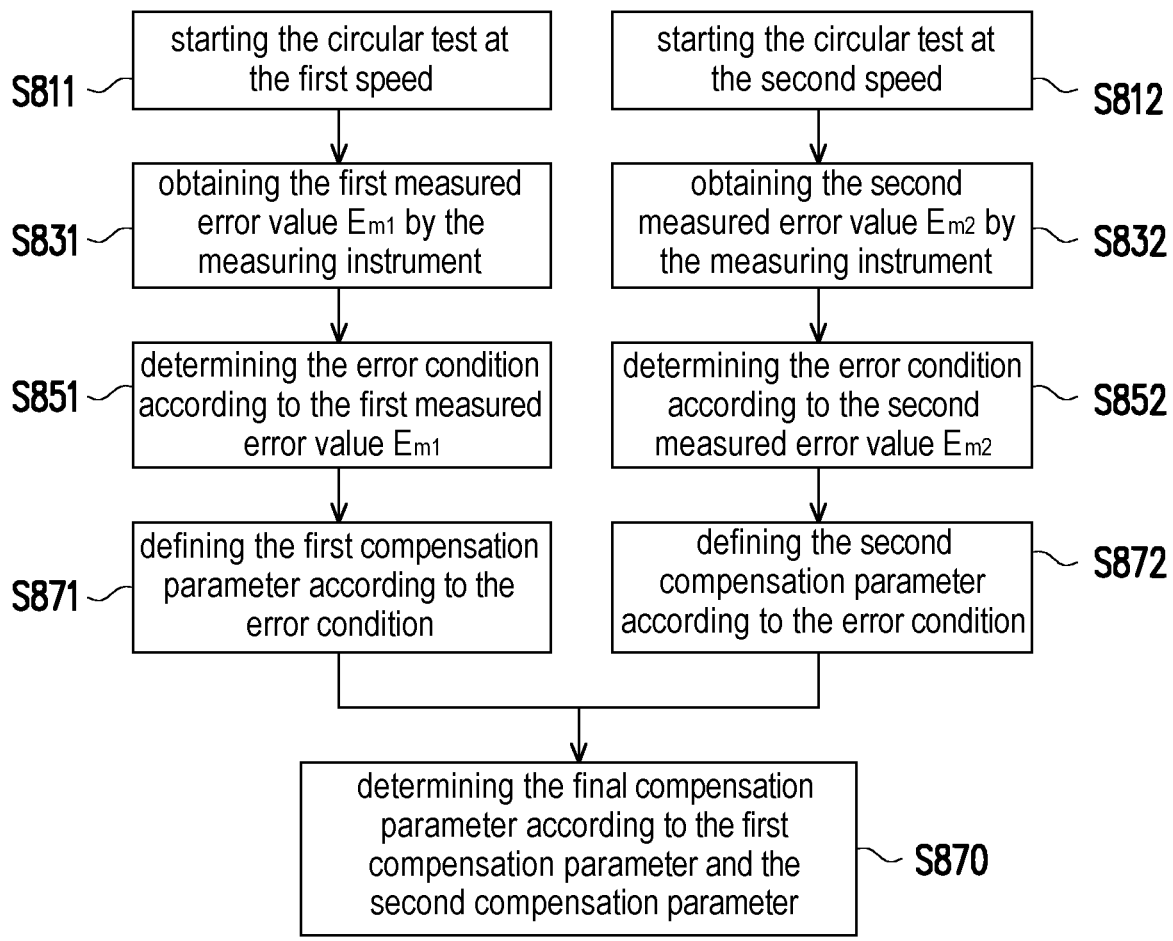
FIG. 8 is a flowchart of steps for defining compensation parameters according to another embodiment of the present disclosure.

Next, please refer to FIG. 7 and FIG. 8, which explain how to define the compensation parameters according to the error condition (step S270). FIG. 7 is a flowchart of steps for defining compensation parameters according to an embodiment of the disclosure. FIG. 8 is a flowchart of steps for defining compensation parameters according to another embodiment of the present disclosure.

As shown in FIG. 7, in this embodiment, before defining the compensation parameters, first, the processor 11 of the machine tool adjustment system 1 executes the error compensation module 133 to perform step S771: determining that the error condition is quadrant-related. More specifically, in this embodiment, the error analysis module 131 is executed by the processor 11 of the machine tool adjustment system 1 to know the error condition of the machine tool 2 when performing the circular test, and the error compensation module 133 is executed by the processor 11 of the machine tool adjustment system 1 to analyze and determine whether the error condition of the machine tool 2 is quadrant-related.

If it is determined in step S771 that the error condition is quadrant-related and the error condition of the machine tool 2 is determined to be inward quadrant, the corresponding compensation parameter is defined to be the compensation time, and subsequently the machine tool adjustment system 1 will notify the controller of the machine tool 2 to set the compensation parameter by shortening the compensation time (step S773). On the other hand, if the error condition of the machine tool 2 is determined to be outward quadrant, then the corresponding compensation parameter is defined to be the compensation amount, and subsequently the machine tool adjustment system 1 will notify the controller of the machine tool 2 to set the compensation parameter by increasing the compensation amount (step S775).

In addition, please refer to FIG. 8. According to another embodiment of the present disclosure, the compensation parameter may be defined according to multiple error conditions of multiple circular tests under different test preset conditions.

Specifically, as shown in FIG. 8, in this embodiment, the machine tool adjustment system 1 will automatically send a signal to allow the controller 23 of the machine tool 2 to send a circular test instruction to the machine tool mechanism 21 according to the preset conditions that are set for circular test, so that the machine tool 2 starts the circular test at the first speed or the second speed (step S811 or step S812); then, the machine tool adjustment system 1 obtains the first measured error value $E_{m1}$ or the second measured error value $E_{m2}$ by the measuring instrument 3 (step S831 or step S832), and the first measured error value $E_{m1}$ or the second measured error value $E_{m2}$ is defined by the difference between the actual circular trajectory when the machine tool 2 performs the circular test at the first speed or the second speed and the preset circular trajectory respectively generated. Then, the machine tool adjustment system 1 can execute the error analysis module 131, according to the first measured error value $E_{m1}$ or the second measured error value $E_{m2}$, to determine the error condition of the machine tool 2 in performing the circular test (step S851 or step S852); for the detailed determining method, please refer to the foregoing description in relation to FIG. 3, and no further descriptions are incorporated herein. Then, the machine tool adjustment system 1 can execute the error compensation module 133 to define the first compensation parameter or the second compensation parameter according to the error condition (step S871 or step S872), and the first compensation parameter and the second compensation parameter respectively correspond to the first speed and the second speed when the machine tool 2 performs the circular test; for details of the method of defining the compensation parameters, please refer to the foregoing descriptions in relation to FIG. 7, and no further descriptions are incorporated herein. Finally, the machine tool adjustment system 1 can execute the error compensation module 133 to determine the final compensation parameter according to the first compensation parameter and the second compensation parameter (step S870), so as to obtain the compensation parameter applicable at different speeds. The calculation method of the final compensation parameter can be performed through general statistical methods or specific calculation formulas adopted by various controller manufacturers, the present disclosure provides no limitation thereto. Thereafter, the final compensation parameter can be provided to the controller 23 of the machine tool 2, so that the controller 23 can complete the adjustment of the machine tool according to the final compensation parameter.

Please note here that the first speed and the second speed shown in FIG. 8 are not only two speeds with different values, but can represent two significantly different speed intervals that may be adopted when the machine tool 2 is actually in use. For example, the first speed can represent the high speed interval, and the second speed can represent the low speed interval. In addition, although FIG. 8 only schematically shows the circular test is performed at two speeds, namely the first speed and the second speed, respectively, but in actual use requirement, a variety of different speeds (or speed intervals, such as high speed, medium speed, low speed, etc.) may be adopted to perform multiple sets of circular tests, and similar steps can be performed to obtain multiple measured error values to define multiple compensation parameters, and finally define the final compensation parameter based on multiple compensation parameters. The present disclosure provides no limitation to the number of times of circular tests and the amount of obtained compensation parameters.

Please refer back to FIG. 2, which will continue to explain the steps of the machine tool adjustment method in the present disclosure. When step S270 (determining the compensation parameter according to the error condition) has been performed as described above, according to the machine tool adjustment method in this disclosure, proceed to step S220: setting the compensation parameter.

Please note that, as shown in FIG. 2, step S220 is indicated by a dashed-line box, which means that the step is an optional step. For example, when performing the circular test for the first time at the same speed, in order to known the initial condition of the machine tool 2, there is no need to set a compensation parameter in advance, in other words, according to the machine tool adjustment method in this disclosure, step S220 is not necessarily required.

Specifically, in this embodiment, in step S220, the processor 11 of the machine tool adjustment system 1 may provide the compensation parameters obtained in the previous step to the controller 23 of the machine tool 2 to set the compensation parameters through error compensation module 133 stored in the memory 13 in advance, so that the machine tool 2 starts to perform the next circular test according to the set compensation parameters. Then, the steps S230, S240, S250, and S270 described above are repeated until in step S250 the machine tool adjustment system 1 determines that the error condition of the machine tool 2 is less than the predetermined criteria, and then proceeds to step S260. The machine tool adjustment system 1 notifies the controller of the machine tool 2 to end the circular test. At this stage, the machine tool 2 has completed the adjustment according to the machine tool adjustment method described in this disclosure.

In this way, the machine tool adjustment method and system of the present disclosure can automatically measure and automatically determine the error conditions of the machine tool 2, such as the backlash value and the protrusion value, etc.; moreover, automatic measurement is performed repeatedly through the method in the present disclosure to perform corresponding compensation so as to adjust the machine tool 2. The machine tool adjustment system 1 can find the optimal compensation parameters at a fixed speed, and can also find the compensation parameters applicable at various speeds.

In summary, the machine tool adjustment method and the system thereof described in the present disclosure can automatically determine the error conditions of the circular movement of the machine tool 2 with respect to the end of the actual machine tool mechanism 21, automatically make compensation according to the error conditions, and optimize the compensation parameters, thereby reducing the time for adjusting the machine tool 2 and further improving the overall performance of the machine tool 2 to ensure the machining accuracy.

Although the present disclosure has been disclosed in the above embodiments, it is not intended to limit the present disclosure, and those skilled in the art can make some modifications and refinements without departing from the spirit and scope of the disclosure. Therefore, the scope to be protected by the present disclosure is subject to the scope defined by the appended claims.

What is claimed is:

1. A machine tool adjustment method for adjusting a machine tool comprising a controller, comprising:
issuing a circular test instruction to enable the machine tool to perform a circular test;
obtaining a measured error value $E_m$ from a measuring instrument, wherein the measured error value $E_m$ is defined by a difference between an actual circular trajectory when the machine tool performs the circular test and a preset circular trajectory;
determining an error condition of the machine tool from the measured error value $E_m$;
determining whether the error condition is less than a predetermined criteria; if not, defining a compensation parameter according to the error condition, providing the compensation parameter to the controller to set the compensation parameter to enable the machine tool to perform another circular test according to the compensation parameter that is set, and repeating the above step until it is determined that the error condition is less than the predetermined criteria; and
if it is determined that the error condition is less than the predetermined criteria, ending the circular test and completing adjustment of the machine tool;
wherein the step of determining the error condition of the machine tool from the measured error value $E_m$ comprises:
calculating a radius deviation $R_d$ and an axial offset value $A_d$ from the measured error value $E_m$;
calculating a corrected axis coordinate value from the radius deviation $R_d$ and the axial offset value $A_d$; and
calculating a corrected error value $E_c$ from the corrected axis coordinate value, wherein the measured error value $E_m$ is defined by a difference between an actual radius $r_a$ of the actual circular trajectory when the machine tool performs the circular test and a preset radius $r_d$ of the preset circular trajectory that is set before the circular test is performed;
the radius deviation $$R_d = \frac{\sum_{1}^{n} E_m}{n},$$

n is the number of times of obtaining the measured error value;
the axial offset value $$A_d = \frac{\sum_{1}^{n} E_m'}{n},$$

$E_m'$ is uniaxial component of the measured error value $E_m$;
the corrected axis coordinate value can be calculated through the following formula:

corrected 1st axis coordinate value $x_1'$=−1st axial offset value $A_{d1}$+(the preset radius $r_d$+the measured error value $E_m$−the radius deviation $R_d$)× cos θ, corrected 2nd axis coordinate value $x_2'$=−2nd axial offset value $A_{d2}$+(the preset radius $r_d$+the measured error value $E_m$−the radius deviation $R_d$)× sin θ, and θ is between 0 and 360 degrees;

and
the corrected error value $E_c$ can be calculated through the following formula:

corrected error value $E_c =$ $$\sqrt{(\text{corrected 1st axis coordinate value } x_1')^2 + (\text{corrected 2nd axis coordinate value } x_2')^2} - \text{the preset radius } r_d.$$

2. The machine tool adjustment method of claim 1, wherein the step of determining the error condition of the machine tool from the measured error value $E_m$ further comprises:
looking for a quadrant-passing-through start point A and a protrusion end point B of the machine tool when performing the circular test from a relationship diagram of the corrected error value $E_c$ changing with time; and
obtaining a point A error value $E_{cA}$ of the corrected error value $E_c$ located at the quadrant-passing-through start point A, a point B error value $E_{cB}$ of the corrected error value $E_c$ located at the protrusion end point B, and calculating a difference between the point A error value $E_{cA}$ and the point B error value $E_{cB}$ to obtain a backlash value of the machine tool when performing the circular test, wherein the backlash value reflects the error condition of the machine tool.

3. The machine tool adjustment method of claim 2, wherein the step of determining the error condition of the machine tool from the measured error value $E_m$ further comprises:

obtaining a maximum error value $E_{cM}$ of a maximum value of the corrected error value $E_c$; and
calculating a difference between the maximum error value $E_{cM}$ and the point B error value $E_{cB}$ to obtain a protrusion value of the machine tool when performing the circular test, wherein the protrusion value reflects the error condition of the machine tool.

4. The machine tool adjustment method of claim 1, wherein the step of determining that the error condition is not less than the predetermined criteria and defining a compensation parameter according to the error condition comprises:
determining that the error condition is quadrant-related, if the error condition is inward quadrant, defining the compensation parameter to be a compensation time according to the error condition and setting the compensation parameter by shortening the compensation time, if the error condition is outward quadrant, defining the compensation parameter to be a compensation amount according to the error condition and setting the compensation parameter by increasing the compensation amount.

5. A machine tool adjustment method for adjusting a machine tool comprising a controller, comprising:
issuing a circular test instruction to enable the machine tool to perform multiple circular tests at multiple speeds, respectively;
obtaining multiple measured error values respectively by a measuring instrument, wherein the measured error values are defined by a difference between an actual circular trajectory when the machine tool performs each of the multiple circular test at the multiple speeds respectively and a preset circular trajectory respectively generated;
determining respective error conditions of the machine tool corresponding to the speeds in performing each of the multiple circular tests according to the measured error values $E_m$;
defining multiple compensation parameters respectively corresponding to the speeds according to each of the error conditions;
defining a final compensation parameter according to the compensation parameters; and
ending the multiple circular tests, and providing the final compensation parameter to the controller so that the controller completes adjustment of the machine tool according to the final compensation parameter;
wherein the step of determining respective error conditions of the machine tool corresponding to the speeds in performing the circular test comprises:
calculating a radius deviation $R_d$ and an axial offset value $A_d$ from the measured error value $E_m$;
calculating a corrected axis coordinate value from the radius deviation $R_d$ and the axial offset value $A_d$; and
calculating a corrected error value $E_c$ from the corrected axis coordinate value, wherein
the measured error value $E_m$ is defined by a difference between an actual radius $r_a$ of the actual circular trajectory when the machine tool performs the circular test and a preset radius $r_d$ of the preset circular trajectory that is set before the circular test is performed;
the radius deviation $$R_d = \frac{\sum_{1}^{n} E_m}{n},$$

n is the number of times of obtaining the measured error value;
the axial offset value $$A_d = \frac{\sum_{1}^{n} E_{m'}}{n},$$

$E_m'$ is uniaxial component of the measured error value $E_m$;
the corrected axis coordinate value can be calculated through the following formula:

corrected 1st axis coordinate value $x_1'$=−1st axial offset value $A_{d1}$+(the preset radius $r_d$+the measured error value $E_m$−the radius deviation $R_d$)× cos θ, corrected 2nd axis coordinate value $x_2'$=−2nd axial offset value $A_{d2}$+(the preset radius $r_d$+the measured error value $E_m$−the radius deviation $R_d$)× sin θ, and θ is between 0 and 360 degrees;

and
the corrected error value $E_c$ can be calculated through the following formula:

corrected error value $E_c =$ $$\sqrt{(\text{corrected 1st axis coordinate value } x_1')^2 + (\text{corrected 2nd axis coordinate value } x_2')^2} - \text{the preset radius } r_d.$$

6. The machine tool adjustment method of claim 5, wherein the step of determining respective error conditions of the machine tool corresponding to the speeds in performing the circular test further comprises:
looking for a quadrant-passing-through start point A and a protrusion end point B of the machine tool when performing the circular test from a relationship diagram of the corrected error value $E_c$ changing with time; and
obtaining a point A error value $E_{cA}$ of the corrected error value $E_c$ located at the quadrant-passing-through start point A, a point B error value $E_{cB}$ of the corrected error value $E_c$ located at the protrusion end point B, and calculating a difference between the point A error value $E_{cA}$ and the point B error value $E_{cB}$ to obtain a backlash value of the machine tool when performing the circular test, wherein the backlash value reflects the error condition of the machine tool.

7. The machine tool adjustment method of claim 5, wherein the step of determining respective error conditions of the machine tool corresponding to the speeds in performing the circular test further comprises:
obtaining a maximum error value $E_{cM}$ of a maximum value of the corrected error value $E_c$; and
calculating a difference between the maximum error value $E_{cM}$ and the point B error value $E_{cB}$ to obtain a protrusion value of the machine tool when performing the circular test, wherein the protrusion value reflects the error condition of the machine tool.

8. A machine tool adjustment system for adjusting a machine tool, comprising:
a memory configured to store an error analysis module and an error compensation module; and
a processor coupled to the memory and configured to execute the error analysis module and the error compensation module, wherein the processor executes the error analysis module to perform the following steps:
obtaining a measured error value $E_m$ from a measuring instrument, wherein the measured error value $E_m$ is defined by a difference between an actual circular trajectory when the machine tool performs the circular test and a preset circular trajectory; and
determining an error condition of the machine tool from the measured error value $E_m$; and
the processor executes the error compensation module to perform the following steps:
determining whether the error condition is less than a predetermined criteria; if not, defining a compensation parameter according to the error condition, and providing the compensation parameter to a controller of the machine tool to set the compensation parameter so that the machine tool starts another circular test according to the set compensation parameter and repeats the above step until it is determined that the error condition is less than the predetermined criteria; and
if it is determined that the error condition is less than the predetermined criteria, notifying the controller of the machine tool to end the circular test and complete adjustment of the machine tool;
wherein the processor executes the error analysis module to further perform the following steps:
calculating a radius deviation $R_d$ and an axial offset value $A_d$ from the measured error value $E_m$;
calculating a corrected axis coordinate value from the radius deviation $R_d$ and the axial offset value $A_d$; and
calculating a corrected error value $E_c$ from the corrected axis coordinate value, wherein
the measured error value $E_m$ is defined by a difference between an actual radius $r_a$ of the actual circular trajectory when the machine tool performs the circular test and a preset radius $r_d$ of the preset circular trajectory that is set before the circular test is performed;
the radius deviation $$R_d = \frac{\sum_{1}^{n} E_m}{n},$$

n is the number of times of obtaining the measured error value;
the axial offset value $$A_d = \frac{\sum_{1}^{n} E_{m'}}{n},$$

$E_m'$ is uniaxial component of the measured error value $E_m$;
the corrected axis coordinate value can be calculated through the following formula:

corrected 1st axis coordinate value $x_1'$=−1st axial offset value $A_{d1}$+(the preset radius $r_d$+the measured error value $E_m$−the radius deviation $R_d$)× cos θ, corrected 2nd axis coordinate value $x_2'$=−2nd axial offset value $A_{d2}$+(the preset radius $r_d$+the measured error value $E_m$−the radius deviation $R_d$)× sin θ, and θ is between 0 and 360 degrees;

and
the corrected error value $E_c$ can be calculated through the following formula:

$$\text{corrected error value } E_c = \sqrt{(\text{corrected 1st axis coordinate value } x'_1)^2 + (\text{corrected 2nd axis coordinate value } x'_2)^2} - \text{the preset radius } r_d.$$

9. The machine tool adjustment system of claim 8, wherein the processor executes the error analysis module to further perform the following steps:
looking for a quadrant-passing-through start point A and a protrusion end point B of the machine tool when performing the circular test from a relationship diagram of the corrected error value $E_c$ changing with time; and
obtaining a point A error value $E_{cA}$ of the corrected error value $E_c$ located at the quadrant-passing-through start point A, a point B error value $E_{cB}$ of the corrected error value $E_c$ located at the protrusion end point B, and calculating a difference between the point A error value $E_{cA}$ and the point B error value $E_{cB}$ to obtain a backlash value of the machine tool when performing the circular test, wherein the backlash value reflects the error condition of the machine tool.

10. The machine tool adjustment system of claim 8, wherein the processor executes the error analysis module to further perform the following steps:
obtaining a maximum error value $E_{cM}$ of a maximum value of the corrected error value $E_c$; and
calculating a difference between the maximum error value $E_{cM}$ and the point B error value $E_{cB}$ to obtain a protrusion value of the machine tool when performing the circular test, wherein the protrusion value reflects the error condition of the machine tool.

11. The machine tool adjustment system of claim 8, wherein the processor executes the error compensation module to further perform the following steps:
determining that the error condition is not less than the predetermined criteria and determining that the error condition is quadrant-related, if the error condition is inward quadrant, defining the compensation parameter to be a compensation time according to the error condition and setting the compensation parameter by shortening the compensation time, if the error condition is outward quadrant, defining the compensation parameter to be a compensation amount according to the error condition and setting the compensation parameter by increasing the compensation amount.

12. The machine tool adjustment system of claim 8, wherein the processor executes the error compensation module to further perform the following steps:
defining multiple compensation parameters according to multiple measured error values obtained from the circular test that is performed corresponding to multiple speeds respectively;
defining a final compensation parameter according to the compensation parameters; and
providing the final compensation parameter to the controller of the machine tool to complete adjustment of the machine tool.

* * * * *